(12) United States Patent
Zhang et al.

(10) Patent No.: US 11,419,062 B2
(45) Date of Patent: Aug. 16, 2022

(54) USER EQUIPMENT TRANSMISSION POWER CONTROL

(71) Applicant: Apple Inc., Cupertino, CA (US)

(72) Inventors: Yushu Zhang, Beijing (CN); Guotong Wang, Beijing (CN); Gang Xiong, Portland, OR (US); Alexei Davydov, Nizhny Novogorod NIZ (RU)

(73) Assignee: Apple Inc., Cupertino, CA (US)

( * ) Notice: Subject to any disclaimer, the term of this patent is extended or adjusted under 35 U.S.C. 154(b) by 251 days.

(21) Appl. No.: 16/502,477

(22) Filed: Jul. 3, 2019

(65) Prior Publication Data

US 2019/0327691 A1 Oct. 24, 2019

Related U.S. Application Data

(60) Provisional application No. 62/694,214, filed on Jul. 5, 2018.

(51) Int. Cl.
*H04W 52/32* (2009.01)
*H04W 52/14* (2009.01)
*H04W 88/02* (2009.01)

(52) U.S. Cl.
CPC ....... *H04W 52/325* (2013.01); *H04W 52/146* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 2013/0163528 A1* | 6/2013 | Kim | H04W 52/367 370/329 |
| 2013/0272257 A1* | 10/2013 | Takaoka | H04B 7/0447 370/329 |
| 2018/0183503 A1* | 6/2018 | Rahman | H04W 72/042 |
| 2020/0274604 A1* | 8/2020 | Sun | H04L 5/00 |
| 2020/0287602 A1* | 9/2020 | Park | H04L 25/0226 |

OTHER PUBLICATIONS

3GPP, "Technical Specification Group Radio Access Network; NR; Physical layer procedures for data (Release 15)," 3GPP TS 38.214 V15.2.0 (Jun. 2018), 5G, 94 pages.
3GPP, "Technical Specification Group Radio Access Network; NR; Physical channels and modulation (Release 15)," 3GPP TS 38.211 V15.2.0 (Jun. 2018), 5G, 96 pages.

* cited by examiner

*Primary Examiner* — Wen W Huang
(74) *Attorney, Agent, or Firm* — Fish & Richardson P.C.

(57) ABSTRACT

Embodiments of the present disclosure provide for mechanisms to enable full-power uplink transmission. Other embodiments may be described and claimed.

22 Claims, 10 Drawing Sheets

USER EQUIPMENT TRANSMISSION POWER CONTROL

CROSS REFERENCE TO RELATED APPLICATION

The present application claims priority to U.S. Provisional Patent Application No. 62/694,214, filed Jul. 5, 2018, and entitled "Mechanisms to Enable User Equipment with Full-Power Transmission" and to PCT Application No. PCT/CN2018/106531, filed Sep. 19, 2018, and entitled "Mechanisms to Enable User Equipment with Full-Power Transmission." The disclosure of these applications are hereby incorporated by reference in their entireties.

FIELD

Embodiments of the present invention relate generally to the technical field of wireless communications.

BACKGROUND

Release 15 of 3rd Generation Partnership Project (3GPP) standards defines uplink codebook and non-codebook based transmission schemes. For the non-codebook based transmission scheme, the technical specifications do not specify any precoding matrices for transmission. Instead, the actual precoding applied to an uplink transmission may be implementation dependent. For the codebook-based transmission scheme, an evolved nodeB (eNB) or next generation nodeB (gNB) may select a preferred precoding matrix from a set of matrices of a codebook and transmit precoding matrix indicator (PMI) feedback to a user equipment (UE) to provide an indication of the selected precoding matrix.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Figure 1:
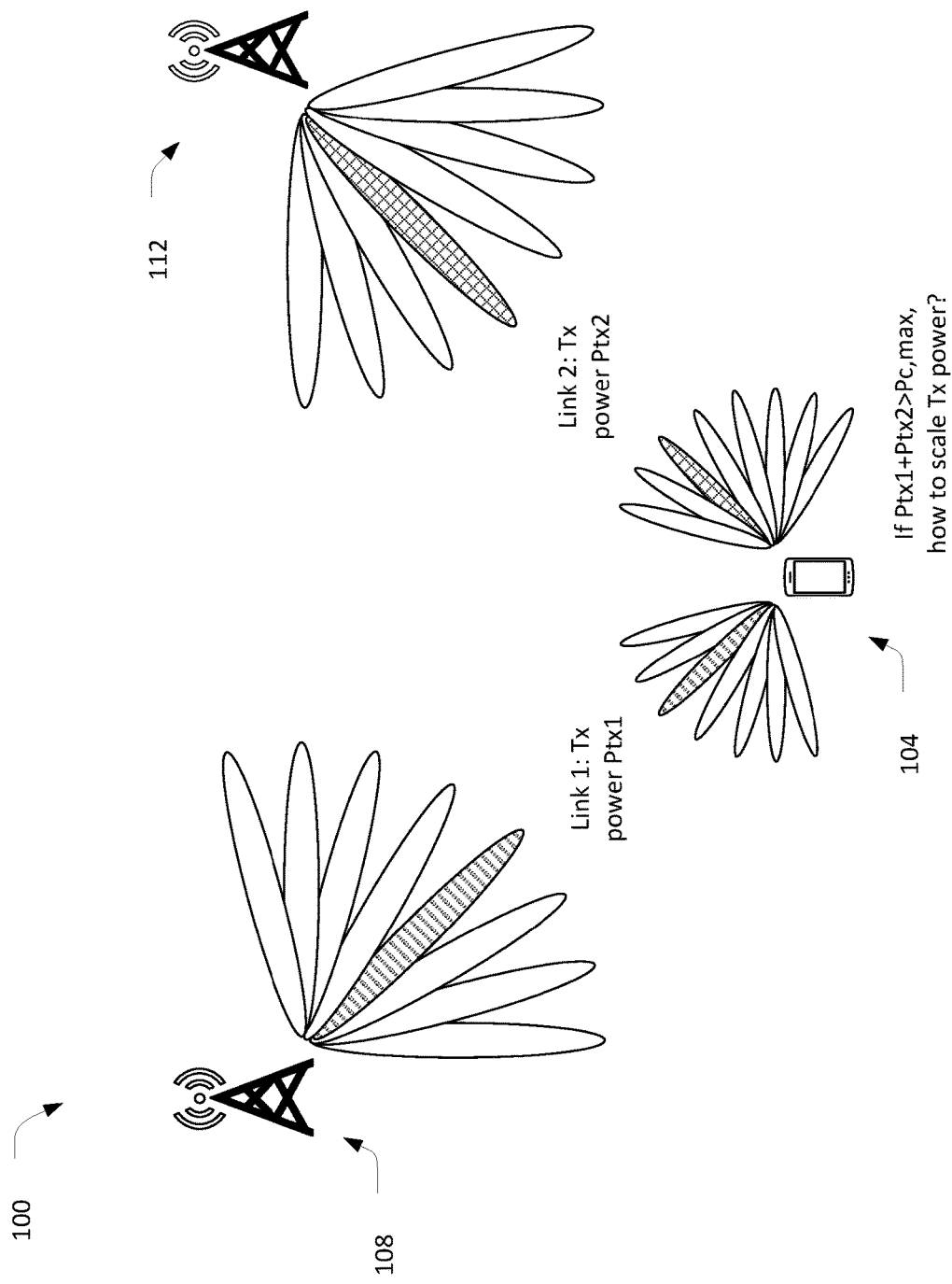
FIG. 1 illustrates a network in accordance with some embodiments.

FIG. 1 illustrates a network 100 in accordance with some embodiments. In general, the components shown in network 100 may be similar to, and substantially interchangeable with, like-named components in other figures described herein. The network 100 may include a user equipment (UE) 104, transmission/reception point (TRP) 108, and TRP 112 the communicate with one another consistent with 5th Generation/New Radio (5G/NR) specifications of the Third Generation Partnership Project (3GPP). The TRPs 108 and 112 may be part of, or associated with, access nodes such as radio access node (RAN) nodes. The TRPs 108 and 112 may also be referred to as evolved node Bs (eNBs), next generation node B (gNBs), etc.

The UE 104 may communicate with the TRPs 108/112 via a plurality of antenna ports by different links. The TRP 108 may communicate with the UE 104 over link 1 having a transmit power of Ptx1. The TRP 112 may simultaneously communicate with the UE 104 over link 2 having a transmit power of Ptx2. Some embodiments describe how to scale a transmit power if the uplink transmit powers of the established links is greater than a maximum allowed transmit power of Pc,max.

Figure 2:
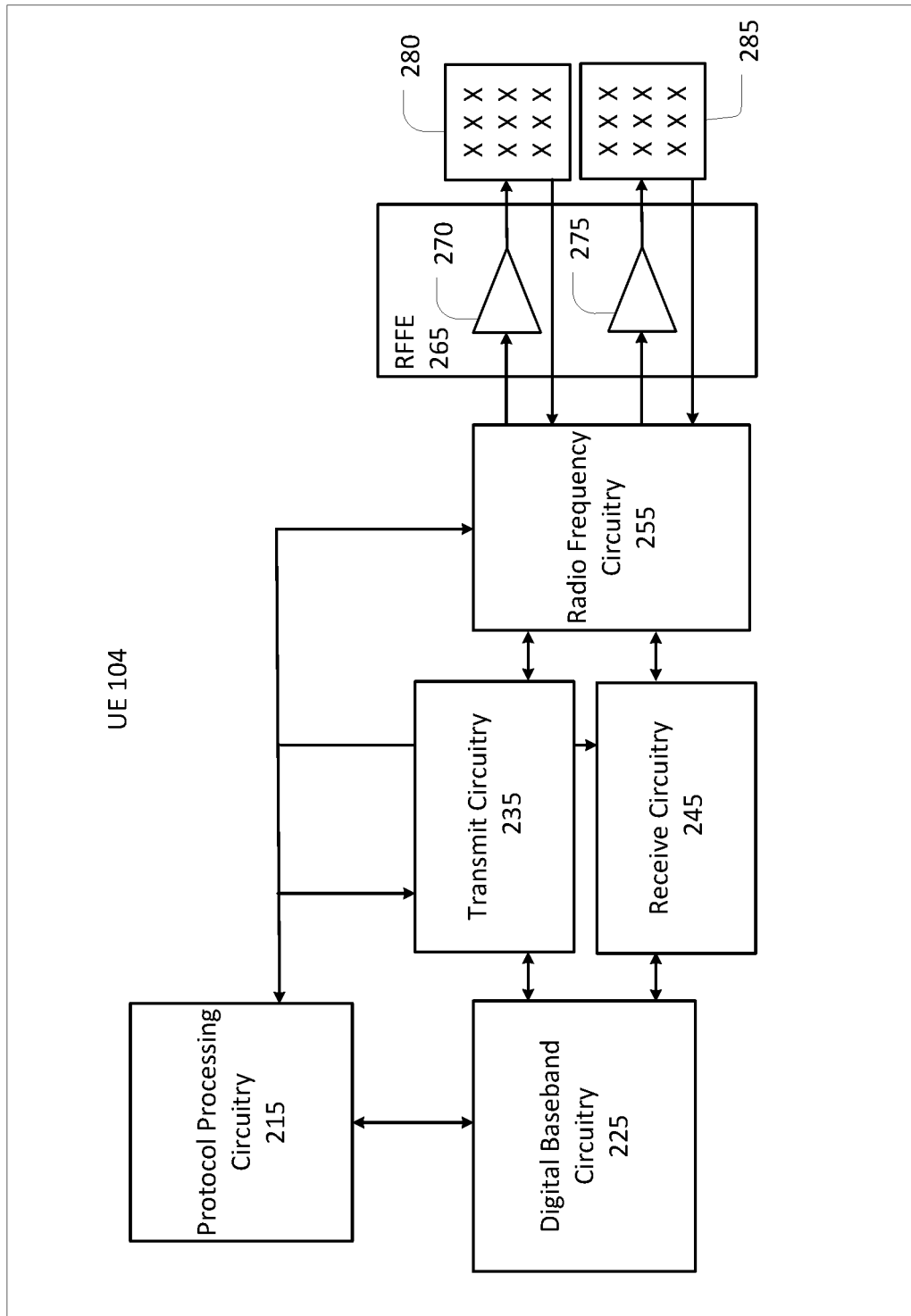
FIG. 2 illustrates a user equipment in accordance with some embodiments.

FIG. 2 schematically illustrates the UE 104 in accordance with various embodiments herein. The UE 104 may be a smartphone (for example, a handheld touchscreen mobile computing device connectable to one or more cellular networks) or any mobile or non-mobile computing devices, such as a Personal Data Assistant (PDA), pager, laptop computer, desktop computer, wireless handset, customer premises equipment (CPE), fixed wireless access (FWA) device, vehicle mounted UE or any computing device including a wireless communications interface. In some embodiments, the UE 104 can comprise an Internet of Things (IoT) UE, which can comprise a network access layer designed for low-power IoT applications utilizing short-lived UE connections. An IoT UE can utilize technologies such as narrowband IoT (NB-IoT), machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An NB-IoT/MTC network describes interconnecting NB-IoT/MTC UEs, which may include uniquely identifiable embedded computing devices (within the Internet infrastructure), with short-lived connections. The NB-IoT/MTC UEs may execute background applications (for example, keep-alive message, status updates, location related services, etc.).

The UE 104 may include protocol processing circuitry 215, which may implement one or more layer operations related to medium access control (MAC), radio link control (RLC), packet data convergence protocol (PDCP), radio resource control (RRC) and non-access stratum (NAS). The protocol processing circuitry 215 may include one or more processing cores (not shown) to execute instructions and one or more memory structures (not shown) to store program and data information.

The UE 104 may further include digital baseband circuitry 225, which may implement physical layer (PHY) functions including one or more of HARQ functions, scrambling and/or descrambling, coding and/or decoding, layer mapping and/or de-mapping, modulation symbol mapping, received symbol and/or bit metric determination, multi-antenna port pre-coding and/or decoding, which may include one or more of space-time, space-frequency or spatial coding, reference signal generation and/or detection, preamble sequence generation and/or decoding, synchronization sequence generation and/or detection, control channel signal blind decoding, and other related functions.

The UE 104 may further include transmit circuitry 235, receive circuitry 245, radio frequency (RF) circuitry 255, and RF front end (RFFE) 265.

The RFFE 265 may include two transmit chains with power amplifiers 270 and 275 respectively coupled with antenna panels 280 and 285.

In some embodiments, the protocol processing circuitry 215 may include one or more instances of control circuitry (not shown) to provide control functions for the digital baseband circuitry 225 (or simply, "baseband circuitry 225"), transmit circuitry 235, receive circuitry 245, radio frequency circuitry 255, RFFE 265, and the antenna panels 280 and 285.

Each transmit chain may be associated with an antenna port, or an antenna port group. The antenna panel 280 may provide uplink transmissions on link 1 with TRP 108 while antenna panel 285 may provide uplink transmissions on link 2 with TRP 112.

In some embodiments, the UE 104 may perform uplink transmissions to the TRPs 108/112 based on uplink codebooks. For example, the TRPs 108/112 may measure a channel and select a precoder from a codebook. The TRPs 108/112 may feedback an indication of the selected precoder. This indication may be referred to as a transmit precoder matrix indicator (TPMI).

Table 1 illustrates one example for a codebook of a single layer transmission for two antenna ports.

TABLE 1

| TPMI index | W (ordered from left to right in increasing order of TPMI index) | | | | | | |
|---|---|---|---|---|---|---|---|
| 0-5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ | — — |

The UE 104 may indicate its capability regarding its support of different antenna port transmission schemes. For example, the UE 104 may send an indication that it supports full coherent transmissions, partial coherent transmissions, or non-coherent transmissions. A full coherent transmission means that all antenna ports are used (non-zero power). A partial coherent transmission means that a subset (for example, a plurality but not all) of antenna ports are used. A non-coherent transmission may mean one of the antenna ports as used. For example, for a four antenna port embodiment, a precoder [1 1 1 1] may indicate a full coherent transmission with all four antenna ports being used; a precoder [1 1 0 0] may indicate indicate a partial coherent transmission with two of the four antenna ports used; and a precoder [1 0 0 0] may indicate a non-coherent transmission with one of the four antenna ports used.

Referring again to Table 1 and a two antenna port scenario, the UE 104 may, in some embodiments, indicate that it only supports non-coherent transmissions. This may imply that only antenna-selection-based precoders may be scheduled. In this example, the TRPs 108/112 may select either of the first to precoders by scheduling TPMI=0 or 1. All of the precoders of Table 1 are scaled by a factor of $$\frac{1}{\sqrt{2}}.$$

Therefore, even if only one antenna port is used, there will still be a 3 dB power reduction.

Furthermore, for cyclic prefix orthogonal frequency division multiplexing (CP-OFDM), the Energy Per Resource Element (EPRE) ratio between Phase Tracking Reference Signal (PT-RS) and physical uplink shared channel (PUSCH) can be configured by higher-layer signaling. Higher-layer signaling, as used herein, refers to signaling above the physical layer. For example, higher-layer signaling may include media access control (MAC) signaling, radio resource control (RRC) signaling, etc.

An example EPRE ratio between PUSCH and PT-RS is shown in Table 2.

TABLE 2

| UL-PTRS-power/$\alpha_{PTRS}^{PUSCH}$ | The number of PUSCH layers ($n_{layer}^{PUSCH}$) | | | | | | | |
|---|---|---|---|---|---|---|---|---|
| | 1 | 2 | | 3 | | 4 | | |
| | All cases | Full coherent | Partial and non-coherent and non-codebook based | Full coherent | Partial and non-coherent and non-codebook based | Full coherent | Partial coherent | Non-coherent and non-codebook based |
| 00 | 0 | 3 | $3Q_p-3$ | 4.77 | $3Q_p-3$ | 6 | $3Q_p$ | $3Q_p-3$ |
| 01 | 0 | 3 | 3 | 4.77 | 4.77 | 6 | 6 | 6 |
| 10 | | | | Reserved | | | | |
| 11 | | | | Reserved | | | | |

The default value for this configuration may be "00," and for non-codebook based transmission, only "00" can be configured. When partial and non-coherent and non-codebook based transmission is used, if "00" is configured, there could be a power reduction for PT-RS. Thus, embodiments also describe how to enable the full-power transmission for PT-RS.

In addition, for multi-panel UE, it may be scheduled multiple uplink transmission in different panels. The power control for each panel may be performed independently. As shown in FIG. 1, how to handle the case when total transmission power for all panels exceed the maximum transmission power could be one issue.

Embodiments herein provide mechanisms to enable the full power transmission for a user equipment (UE). Some embodiments include PUSCH/PT-RS transmission power scaling for non-coherent, partial-coherent and non-codebook based transmission. Some embodiments provide uplink transmission power scaling for multi-panel transmission.

PUSCH/PT-RS Transmission Power Scaling

A UE with a single power amplifier may not be able to borrow power from one antenna port to another antenna port. The UE 104, having multiple power amplifiers 270 and 275, may be able to borrow power between antenna ports.

In an embodiment, the UE 104 may report whether it can support full-power transmission for non-coherent, partial-coherent, or non-codebook based transmission separately or jointly as a UE capability. Further, the UE 104 can report its supported PUSCH to PT-RS EPRE ratio configuration, and the candidate value could be {"00", "00 and 01"}. Alternatively, if the UE 104 cannot support full-power transmission for one transmission operation, e.g. non-coherent or partial-coherent or non-codebook based, the UE 104 may expect the PUSCH to PT-RS EPRE ratio to be configured as "00."

In some embodiments, access node may configure UEs with a plurality of different codebooks. For example, a first codebook, such as the codebook described in Table 1, may be used as a default codebook configuration. UEs that support full-power transmission may also be configured with a second codebook such as the codebook described in Table 3, which a codebook of a single-layer transmission for two antenna ports.

TABLE 3

| TPMI index | W (ordered from left to right in increasing order of TPMI index) |
|---|---|
| 0-5 | $\begin{bmatrix}1\\0\end{bmatrix}$  $\begin{bmatrix}0\\1\end{bmatrix}$  $\frac{1}{\sqrt{2}}\begin{bmatrix}1\\1\end{bmatrix}$  $\frac{1}{\sqrt{2}}\begin{bmatrix}1\\-1\end{bmatrix}$  $\frac{1}{\sqrt{2}}\begin{bmatrix}1\\j\end{bmatrix}$  $\frac{1}{\sqrt{2}}\begin{bmatrix}1\\-j\end{bmatrix}$  — — |

Each precoder of the full-power transmission may be scaled such that total transmission power from all ports can reach the maximum transmission power. Comparing the codebooks from Table 2 to Table 3, the scaling factor on the first two precoders has been increased from $$\frac{1}{\sqrt{2}}$$

to 1. So, if for example, either TPMI index 0 or 1 are scheduled, the UE 104 may transmit with one of the antenna ports at full power without the ~30% power reduction from using the $$\frac{1}{\sqrt{2}}$$

scaling factor.

In some embodiments, one UE may be configured with both a full-power transmission codebook and a non-full-power transmission codebook. For example, the UE 104 may use a full-power codebook for a first antenna port (e.g., one associated with PA 270 and antenna panel 280) and use a non-full-power codebook for a second antenna port (e.g., the one associated with PA 275 and antenna panel 285).

In some embodiments, the codebook(s) for uplink transmission can be configured by higher-layer signaling and/or based on UE capability. By default, a non-full-power codebook, such as the one in Table 1, should be used.

In some embodiments, a scaling factor for coherent/partial-coherent based precoder(s) in an uplink codebook can be configured by higher-layer signaling. Table 4 illustrates an example for single-layer codebook for 2 antenna port, where $\beta$ is the scaling factor, which can be configured by higher-layer signaling. The scaling factor's candidate value is $$\left\{\frac{1}{\sqrt{2}}, 1\right\}.$$

In some embodiments, the smallest number may be the default value for the scaling factor.

TABLE 4

| TPMI index | W (ordered from left to right in increasing order of TPMI index) | | | | | | |
|---|---|---|---|---|---|---|---|
| 0-5 | $\beta\begin{bmatrix}1\\0\end{bmatrix}$ | $\beta\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ | — — |

The maximum transmission may be defined in different ways in frequency range 1 (FR1), which may include the sub-6 gigahertz (GHz) frequency bands, and frequency range 2 (FR2), which may include the frequency bands from 24.25 to 52.6 GHz. Embodiments described herein may be applied to FR1, FR2, or both.

In some embodiments, the scaling factor can be different for different antenna ports. Some UE antenna ports can support full-power transmission, while some cannot. The scaling factor can be determined by UE capability and configured by higher layer signaling. Table 5 illustrates an example for single-layer codebook for 2 antenna port, where $\beta_1$ and $\beta_2$ can be configured by higher-layer signaling, and its candidate value is $$\left\{\frac{1}{\sqrt{2}}, 1\right\}.$$

In some embodiments, the smallest number should be the default value. In one example, the UE 104 may report it supports $\beta_1=1$ and $$\beta_2 = \frac{1}{\sqrt{2}}.$$

Then the access node can configure $$\frac{1}{\sqrt{2}}$$

or 1 for $\beta_1$, and $$\frac{1}{\sqrt{2}}$$

only for $\beta_2$.

TABLE 5

| TPMI index | W (ordered from left to right in increasing order of TPMI index) | | | | | | | |
|---|---|---|---|---|---|---|---|---|
| 0-5 | $\beta_1\begin{bmatrix}1\\0\end{bmatrix}$ | $\beta_2\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ | — | — |

In various embodiments, a scaling factor may be specific to an antenna port or antenna port group, specific to a subset of antenna ports or antenna port groups, or common across all antenna ports. For example, if the UE 104 has four ports, one scaling factor could apply to one port, two ports, three ports or four ports. If a scaling factor applies to less than all the ports, one or more other scaling factors may apply to the other ports.

In some embodiments, the scaling factor can also be defined as a power boosting factor for PUSCH. If non-coherent or partial coherent based precoder is selected and antenna ports that supports full power transmission are selected, the UE 104 can borrow the power from unused antenna ports to the selected antenna ports. For example, if TPMI=0 is selected for single layer transmission for 2 ports case and UE can support full power transmission for the first antenna port, the UE 104 can boost 3 dB power for the PUSCH transmission.

Uplink Transmission Power Scaling for Multi-Panel Transmission

If the total transmission power from multiple UE panels exceed the maximum transmission power, the transmission power for some or all panels may be scaled.

In some embodiments, for a transmission occasion, the transmission power for all the panels with uplink transmission could be scaled equally to make sure the total transmission power does not exceed the maximum transmission power.

In some embodiments, for a transmission occasion, the transmission power of a panel with lower priority may be scaled down, while the transmission power of a panel with higher priority is either not scaled down or is scaled down less than the panel handling the lower power transmission. The priority of the transmission may be determined by the type of the uplink signal (e.g., PRACH, PUCCH, PUSCH and SRS), the content of the uplink signal (e.g., whether CSI or ACK/SR is transmitted, whether it carries beam failure recovery request, and so on), the time domain behavior for the uplink signal (e.g., whether it is periodic, aperiodic, or semi-persistent), or the triggering scheme (e.g., grant based or configured grant based).

In an example, the priority can be defined as PRACH>PUCCH>PUSCH>SRS. In another example, the priority can be uplink channel with ACK/SR>uplink channel with CSI. In another example, the priority can be aperiodic SRS>semi-persistent SRS>periodic SRS. In another example, the priority can be grant based PUSCH>configured grant based PUSCH.

The power scaling may be applied to overlapping symbols or the whole duration for each transmission occasion.

In an embodiment, for multi-panel transmission, the power control for each panel may be independent, therefore the EPRE ratio between PUSCH and PT-RS for each PT-RS antenna port may be configured independently, which may be based on the number of PUSCH layers as well as the number of PT-RS antenna port in that panel.

If some or all panels share one power control parameter set, the PT-RS antenna port(s) in those panels can be determined by the number of total PUSCH layers and number of total PT-RS antenna port(s) in those panels, and the same transmission power should be applied to each antenna port.

Figure 3:
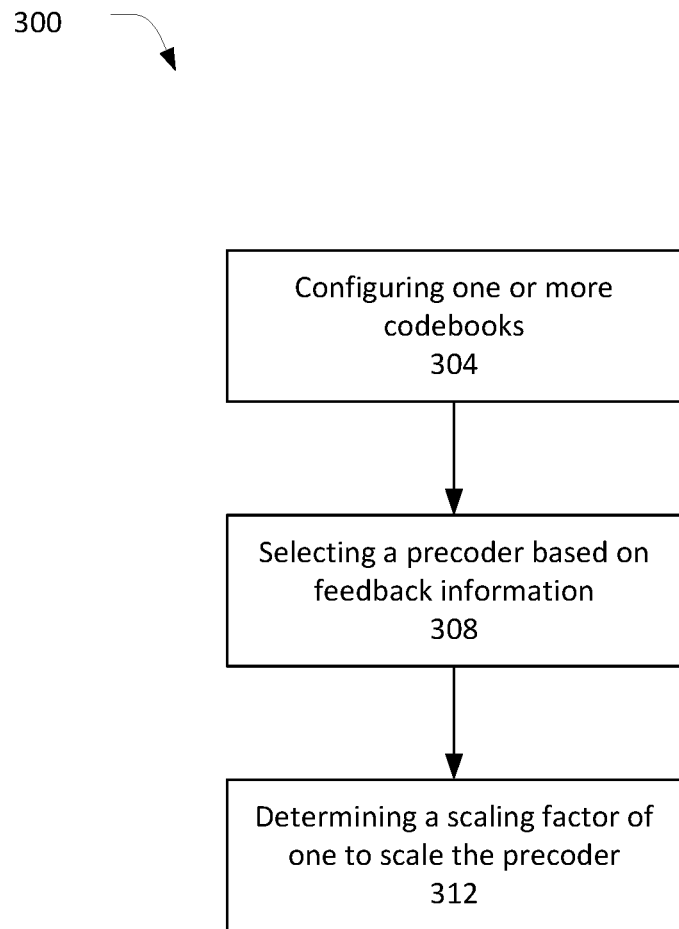
FIG. 3 illustrates an operation flow/algorithmic structure in accordance with some embodiments.

FIG. 3 illustrates an algorithmic structure (AS)/operation flow (OF) 300 in accordance with some embodiments. The AS/OF 300 may be implemented by a user equipment (e.g., UE 104), or components thereof (e.g., protocol processing circuitry 215, digital baseband circuitry 225, baseband circuitry 710, etc.).

At 304, the AS/OF 300 may include configuring one or more codebooks. The codebook(s) may be configured based on configuration information signaled by an access node. In other embodiments, the codebooks may be configured based on stored, e.g., pre-programmed, configuration information. The codebooks may include a full-power codebook or a non-full-power codebook.

At 308, the AS/OF 300 may include selecting a precoder based on feedback information. The feedback information may include, for a TPMI, from an access node that is to indicate a precoder selected by the access node. The TPMI may be used to identify the precoder within a configured codebook.

At 312, the AS/OF 300 may include determining a scaling factor of one to scale the precoder. In some embodiments, the UE implementing AS/OF 300 may support non-coherent transmission only and the precoder may be an antenna-selection-based precoder (such as either $$\begin{bmatrix} 1 \\ 0 \end{bmatrix} \text{ or } \begin{bmatrix} 0 \\ 1 \end{bmatrix}$$

as also shown in the first two records of Table 3). The scaling factor of one may enable the UE to perform a full power transmission of, for example, a PUSCH transmission.

In some embodiments, the scaling factor may be configured as part of the codebook, as in Table 3. In other embodiments, the scaling factor may be signaled separately, as a β value, to be used with a configured codebook. The scaling factor may be configured on a per-antenna port basis, a per-antenna port group basis, or may be configured for all antenna ports of a UE.

Figure 4:
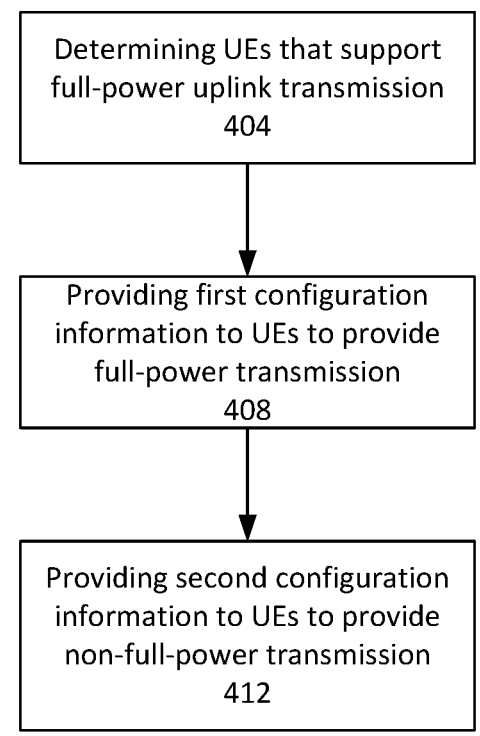
FIG. 4 illustrates an operation flow/algorithmic structure in accordance with some embodiments.

FIG. 4 illustrates an AS/OF 400 in accordance with some embodiments. The AS/OF 400 may be implemented by an access node (e.g., TRP 108 or 112), or components thereof (e.g., application circuitry 605, baseband circuitry 610, etc.).

At 404, the AS/OF 400 may include determining UEs that support full-power uplink transmissions. This determination may be based on capability information signaled by the UEs. In some embodiments, if capability information that indicates a UE supports full-power transmission for at least some of its antenna ports is not received, the access node may determine, as a default, that the UE does not support full-power transmission.

At 408, the AS/OF 400 may include providing first configuration information to UEs to provide full-power transmission. The first configuration information may include a full-power codebook (for example, as in Table 3) or may include full-power scaling factors to use with a codebook configured for both full-power and non-full-power codebooks (for example, as in Tables 4 and 5).

At 412, the AS/OF 400 may include providing second configuration information to UEs to provide non-full-power transmission. The second configuration may include a non-full-power codebook (for example, as in Table 2) or may include non-full-power scaling factors to use with a codebook configured for both full-power and non-full-power codebooks (for example, as in Tables 4 and 5).

Figure 5:
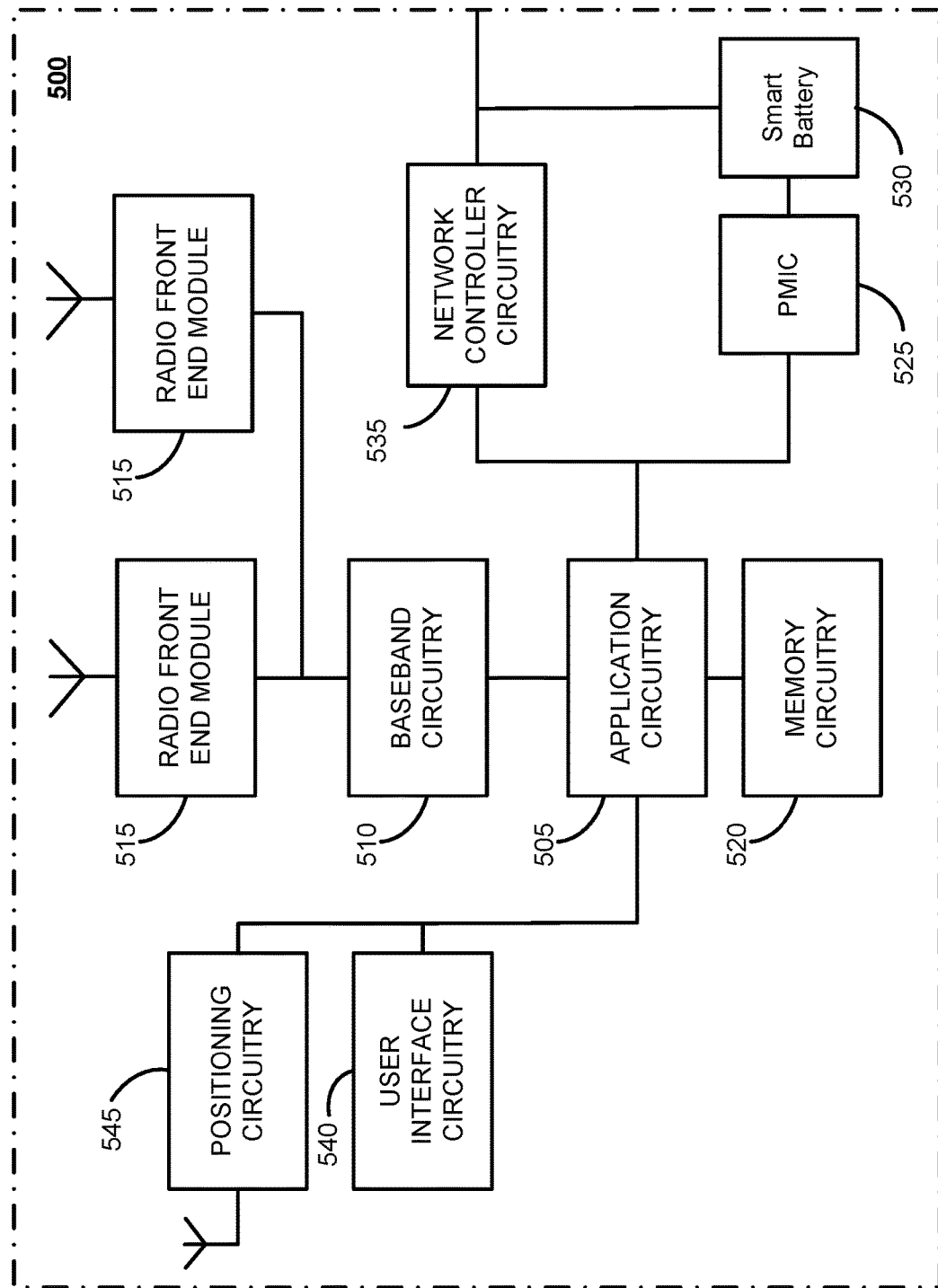
FIG. 5 illustrates an example of infrastructure equipment in accordance with various embodiments.

FIG. 5 illustrates an example of infrastructure equipment 500 in accordance with various embodiments. The infrastructure equipment 500 (or "system 500") may be implemented as an access node, for example, TRP 108 or 112, shown and described previously. The system 500 may include one or more of application circuitry 505, baseband circuitry 510, one or more radio front end modules 515, memory circuitry 520, power management integrated circuitry (PMIC) 525, power tee circuitry 530, network controller circuitry 535, network interface connector 540, satellite positioning circuitry 545, and user interface 550. In some embodiments, the device 500 may include additional elements such as, for example, memory/storage, display, camera, sensor, or input/output (I/O) interface. In other embodiments, the components described below may be included in more than one device (e.g., said circuitries may be separately included in more than one device for CRAN, vBBU, or other like implementations).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as, "processor circuitry." As used herein, the term "processor circuitry" may refer to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Application circuitry 505 may include one or more central processing unit (CPU) cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 505 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 500 may not utilize application circuitry 505, and instead may include a special-purpose processor/controller to process IP data received from an EPC or 5GC, for example.

Additionally or alternatively, application circuitry 505 may include circuitry such as, but not limited to, one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 505 may comprise logic blocks or logic fabric, and other interconnected resources that may be programmed to perform various functions, such as the procedures, methods, functions, etc. of the various embodiments discussed herein. In such embodiments, the circuitry of application circuitry 505 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 510 may be implemented, for example, as a solder-down substrate including one or more integrated circuits, a single packaged integrated circuit soldered to a main circuit board or a multi-chip module containing two or more integrated circuits. Although not shown, baseband circuitry 510 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 510 may include protocol processing circuitry with one or more instances of control circuitry (not shown) to provide control functions for the digital baseband circuitry and/or radio frequency circuitry (e.g., the radio front end modules 515).

User interface circuitry 550 may include one or more user interfaces designed to enable user interaction with the system 500 or peripheral component interfaces designed to enable peripheral component interaction with the system 500. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 515 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 515. The RFEMs 515 may incorporate both millimeter wave antennas and sub-millimeter wave antennas.

The memory circuitry 520 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 520 may be implemented as one or more of solder down packaged integrated circuits, socketed memory modules and plug-in memory cards.

The PMIC 525 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 530 may provide for electrical power drawn from a network cable to provide both power supply and data connectivity to the infrastructure equipment 500 using a single cable.

The network controller circuitry 535 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 500 via network interface connector 540 using a physical connection, which may be electrical (commonly referred to as a "copper interconnect"), optical, or wireless. The network controller circuitry 535 may include one or more dedicated processors and/or FPGAs to communicate using one or more of the aforementioned protocols. In some implementations, the network controller circuitry 535 may include multiple controllers to provide connectivity to other networks using the same or different protocols.

The positioning circuitry 545 may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 545 may comprise various hardware elements (e.g., including hardware devices such as switches, filters, amplifiers, antenna elements, and the like to facilitate OTA communications) to communicate with components of a positioning network, such as navigation satellite constellation nodes.

The components shown by FIG. 5 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I2C interface, an SPI interface, point to point interfaces, and a power bus, among others.

Figure 6:
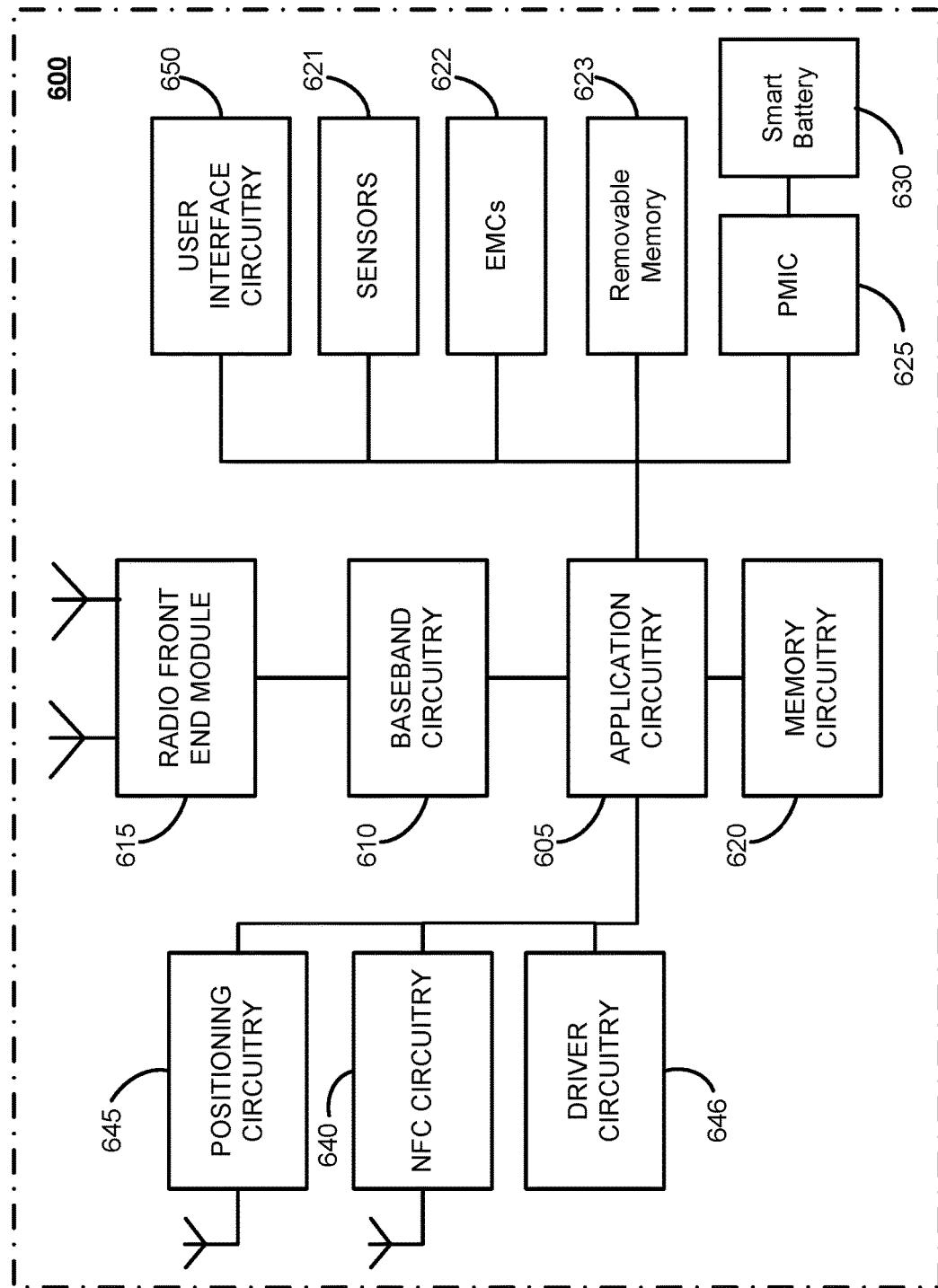
FIG. 6 depicts example components of a computer platform or device in accordance with various embodiments.

FIG. 6 illustrates an example of a platform 600 (or "device 600") in accordance with various embodiments. In embodiments, the computer platform 600 may be suitable for use as UE 104. The platform 600 may include any combinations of the components shown in the example. The components of platform 600 may be implemented as integrated circuits (ICs), portions thereof, discrete electronic devices, or other modules, logic, hardware, software, firmware, or a combination thereof adapted in the computer platform 600, or as components otherwise incorporated within a chassis of a larger system. The block diagram of FIG. 6 is intended to show a high level view of components of the computer platform 600. However, some of the components shown may be omitted, additional components may be present, and different arrangement of the components shown may occur in other implementations.

The application circuitry 605 may include circuitry such as, but not limited to, single-core or multi-core processors and one or more of cache memory, low drop-out voltage regulators (LDOs), interrupt controllers, serial interfaces such as serial peripheral interface (SPI), inter-integrated circuit (I2C) or universal programmable serial interface circuit, real time clock (RTC), timer-counters including interval and watchdog timers, general purpose input/output (10), memory card controllers such as secure digital/multimedia card (SD/MMC) or similar, universal serial bus (USB) interfaces, mobile industry processor interface (MIPI) interfaces and Joint Test Access Group (JTAG) test access ports. The processor(s) may include any combination of general-purpose processors and/or dedicated processors (e.g., graphics processors, application processors, etc.). The processors (or cores) may be coupled with or may include memory/storage and may be configured to execute instructions stored in the memory/storage to enable various applications or operating systems to run on the platform 600. In some embodiments, processors of application circuitry XS105/605 may process IP data packets received from an EPC or 5GC.

Application circuitry 605 may be or include a microprocessor, a multi-core processor, a multithreaded processor, an ultra-low voltage processor, an embedded processor, or other known processing element. In one example, the application circuitry 605 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 605 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc.; an ARM-based design licensed from ARM Holdings, Ltd.; or the like. In some implementations, the application circuitry 605 may be a part of a system on a chip (SoC) in which the application circuitry 605 and other components are formed into a single integrated circuit, or a single package, such as the Edison™ or Galileo™ SoC boards from Intel® Corporation.

Additionally or alternatively, application circuitry 605 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 605 may comprise logic blocks or logic fabric, and other interconnected resources that may be programmed to perform various functions, such as the procedures, methods, functions, etc. of the various embodiments discussed herein. In such embodiments, the circuitry of application circuitry 605 may include memory cells (e.g., erasable programmable read-only memory (EPROM), electrically erasable programmable read-only memory (EEPROM), flash memory, static memory (e.g., static random access memory (SRAM), antifuses, etc.)) used to store logic blocks, logic fabric, data, etc. in look-up tables (LUTs) and the like.

The baseband circuitry 610, which may include both digital baseband circuitry 225 and protocol processing circuitry 215, may be implemented, for example, as a solder-down substrate including one or more integrated circuits, a single packaged integrated circuit soldered to a main circuit board or a multi-chip module containing two or more integrated circuits. Although not shown, baseband circuitry 610 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 610 may include protocol processing circuitry with one or more instances of control circuitry (not shown) to provide control functions for the digital baseband circuitry and/or radio frequency circuitry (e.g., the radio front end modules 615).

The radio front end modules (RFEMs) 615 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 615. The RFEMs 615 may incorporate both millimeter wave antennas and sub-millimeter wave antennas.

The memory circuitry 620 may include any number and type of memory devices used to provide for a given amount of system memory. As examples, the memory circuitry 620 may include one or more of volatile memory including random access memory (RAM), dynamic RAM (DRAM)

and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 620 may be developed in accordance with a Joint Electron Devices Engineering Council (JEDEC) low power double data rate (LPDDR)-based design, such as LPDDR2, LPDDR3, LPDDR4, or the like. Memory circuitry 620 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 620 may be on-die memory or registers associated with the application circuitry 605. To provide for persistent storage of information such as data, applications, operating systems and so forth, memory circuitry 620 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 600 may incorporate the three-dimensional (3D) cross-point (XPOINT) memories from Intel® and Micron®.

Removable memory circuitry 623 may include devices, circuitry, enclosures/housings, ports or receptacles, etc. used to couple portable data storage devices with the platform 600. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 600 may also include interface circuitry (not shown) that is used to connect external devices with the platform 600. The external devices connected to the platform 600 via the interface circuitry may include sensors 621, such as accelerometers, level sensors, flow sensors, temperature sensors, pressure sensors, barometric pressure sensors, and the like. The interface circuitry may be used to connect the platform 600 to electro-mechanical components (EMCs) 622, which may allow platform 600 to change its state, position, and/or orientation, or move or control a mechanism or system. The EMCs 622 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 600 may be configured to operate one or more EMCs 622 based on one or more captured events and/or instructions or control signals received from a service provider and/or various clients.

In some implementations, the interface circuitry may connect the platform 600 with positioning circuitry 645, which may be the same or similar as the positioning circuitry 545 discussed with regard to FIG. 5.

In some implementations, the interface circuitry may connect the platform 600 with Near-Field Communication (NFC) circuitry 640, which may include an NFC controller coupled with an antenna element and a processing device. The NFC circuitry 640 may be configured to read electronic tags and/or connect with another NFC-enabled device.

The driver circuitry 646 may include software and hardware elements that operate to control particular devices that are embedded in the platform 600, attached to the platform 600, or otherwise communicatively coupled with the platform 600. The driver circuitry 646 may include individual drivers allowing other components of the platform 600 to interact with or control various input/output (I/O) devices that may be present within, or connected to, the platform 600. For example, driver circuitry 646 may include a display driver to control and allow access to a display device, a touchscreen driver to control and allow access to a touchscreen interface of the platform 600, sensor drivers to obtain sensor readings of sensors 621 and control and allow access to sensors 621, EMC drivers to obtain actuator positions of the EMCs 622 and/or control and allow access to the EMCs 622, a camera driver to control and allow access to an embedded image capture device, audio drivers to control and allow access to one or more audio devices.

The power management integrated circuitry (PMIC) 625 (also referred to as "power management circuitry 625") may manage power provided to various components of the platform 600. In particular, with respect to the baseband circuitry 610, the PMIC 625 may control power-source selection, voltage scaling, battery charging, or DC-to-DC conversion. The PMIC 625 may often be included when the platform 600 is capable of being powered by a battery 630, for example, when the device is included in UE 104.

In some embodiments, the PMIC 625 may control, or otherwise be part of, various power saving mechanisms of the platform 600. For example, if the platform 600 is in an RRC Connected state, where it is still connected to the RAN node as it expects to receive traffic shortly, then it may enter a state known as Discontinuous Reception Mode (DRX) after a period of inactivity. During this state, the platform 600 may power down for brief intervals of time and thus save power. If there is no data traffic activity for an extended period of time, then the platform 600 may transition off to an RRC Idle state, where it disconnects from the network and does not perform operations such as channel quality feedback, handover, etc. The platform 600 goes into a very low power state and it performs paging where again it periodically wakes up to listen to the network and then powers down again. The platform 600 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 630 may power the platform 600, although in some examples the platform 600 may be mounted deployed in a fixed location, and may have a power supply coupled to an electrical grid. The battery 630 may be a lithium ion battery, a metal-air battery, such as a zinc-air battery, an aluminum-air battery, a lithium-air battery, and the like. In some implementations, such as in V2X applications, the battery 630 may be a typical lead-acid automotive battery.

In some implementations, the battery 630 may be a "smart battery," which includes or is coupled with a Battery Management System (BMS) or battery monitoring integrated circuitry. The BMS may be included in the platform 600 to track the state of charge (SoCh) of the battery 630. The BMS may be used to monitor other parameters of the battery 630 to provide failure predictions, such as the state of health (SoH) and the state of function (SoF) of the battery 630. The BMS may communicate the information of the battery 630 to the application circuitry 605 or other components of the platform 600. The BMS may also include an analog-to-digital (ADC) convertor that allows the application circuitry 605 to directly monitor the voltage of the battery 630 or the current flow from the battery 630. The battery parameters may be used to determine actions that the platform 600 may perform, such as transmission frequency, network operation, sensing frequency, and the like.

A power block, or other power supply coupled to an electrical grid may be coupled with the BMS to charge the battery 630. In some examples, the power block XS30 may be replaced with a wireless power receiver to obtain the power wirelessly, for example, through a loop antenna in the computer platform 600. In these examples, a wireless battery charging circuit may be included in the BMS. The specific charging circuits chosen may depend on the size of the battery 630, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 650 includes various input/output (I/O) devices present within, or connected to, the platform 600, and includes one or more user interfaces designed to enable user interaction with the platform 600 and/or peripheral component interfaces designed to enable peripheral component interaction with the platform 600. The user interface circuitry 650 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chyrstal Displays (LCD), LED displays, quantum dot displays, projectors, etc.), with the output of characters, graphics, multimedia objects, and the like being generated or produced from the operation of the platform 600. The output device circuitry may also include speakers or other audio emitting devices, printer(s), and/or the like. In some embodiments, the sensor circuitry 621 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a universal serial bus (USB) port, an audio jack, a power supply interface, etc.

Although not shown, the components of platform 600 may communicate with one another using a suitable bus technology, which may include any number of technologies, including industry standard architecture (ISA), extended ISA (EISA), peripheral component interconnect (PCI), peripheral component interconnect extended (PCIx), PCI express (PCIe), a Time-Trigger Protocol (TTP) system, a FlexRay system, or any number of other technologies. The bus may be a proprietary bus, for example, used in a SoC based system. Other bus systems may be included, such as an I2C interface, an SPI interface, point-to-point interfaces, and a power bus, among others 625 may often be included when the platform 600 is capable of being powered by a battery 630, for example, when the device is included in the UE 104.

In some embodiments, the PMIC 625 may control, or otherwise be part of, various power saving mechanisms of the platform 600. For example, if the platform 600 is in an RRC Connected state, where it is still connected to the RAN node as it expects to receive traffic shortly, then it may enter a state known as Discontinuous Reception Mode (DRX) after a period of inactivity. During this state, the platform 600 may power down for brief intervals of time and thus save power. If there is no data traffic activity for an extended period of time, then the platform 600 may transition off to an RRC Idle state, where it disconnects from the network and does not perform operations such as channel quality feedback, handover, etc. The platform 600 goes into a very low power state and it performs paging where again it periodically wakes up to listen to the network and then powers down again. The platform 600 may not receive data in this state, in order to receive data, it must transition back to RRC Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 630 may power the platform 600, although in some examples the platform 600 may be mounted deployed in a fixed location, and may have a power supply coupled to an electrical grid. The battery 630 may be a lithium ion battery, a metal-air battery, such as a zinc-air battery, an aluminum-air battery, a lithium-air battery, and the like. In some implementations, such as in V2X applications, the battery 630 may be a typical lead-acid automotive battery.

[98] In some implementations, the battery 630 may be a "smart battery," which includes or is coupled with a Battery Management System (BMS) or battery monitoring integrated circuitry. The BMS may be included in the platform 600 to track the state of charge (SoCh) of the battery 630. The BMS may be used to monitor other parameters of the battery 630 to provide failure predictions, such as the state of health (SoH) and the state of function (SoF) of the battery 630. The BMS may communicate the information of the battery 630 to the application circuitry 605 or other components of the platform 600. The BMS may also include an analog-to-digital (ADC) convertor that allows the application circuitry 605 to directly monitor the voltage of the battery 630 or the current flow from the battery 630. The battery parameters may be used to determine actions that the platform 600 may perform, such as transmission frequency, network operation, sensing frequency, and the like.

A power block, or other power supply coupled to an electrical grid may be coupled with the BMS to charge the battery 630. In some examples, the power block may be replaced with a wireless power receiver to obtain the power wirelessly, for example, through a loop antenna in the computer platform 600. In these examples, a wireless battery charging circuit may be included in the BMS. The specific charging circuits chosen may depend on the size of the battery 630, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Although not shown, the components of platform 600 may communicate with one another using a suitable bus technology, which may include any number of technologies, including industry standard architecture (ISA), extended ISA (EISA), peripheral component interconnect (PCI), peripheral component interconnect extended (PCIx), PCI express (PCIe), a Time-Trigger Protocol (TTP) system, or a FlexRay system, or any number of other technologies. The bus may be a proprietary bus, for example, used in a SoC based system. Other bus systems may be included, such as an I2C interface, an SPI interface, point to point interfaces, and a power bus, among others.

Figure 7:
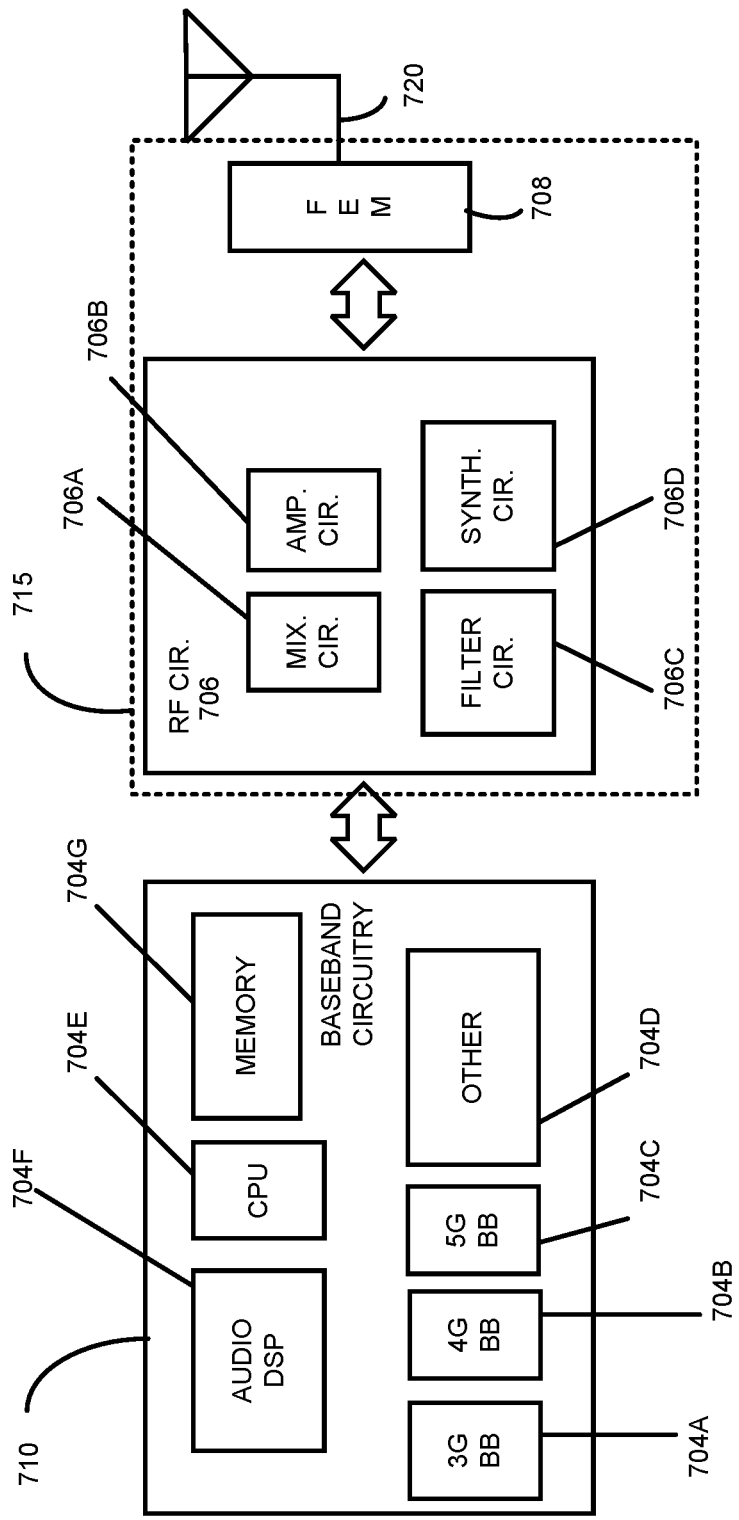
FIG. 7 depicts example components of baseband circuitry and radio frequency end modules in accordance with various embodiments.

FIG. 7 illustrates example components of baseband circuitry 710 and radio front end modules (RFEM) 715 in accordance with various embodiments. As shown, the RFEM 615 may include Radio Frequency (RF) circuitry 706, front-end module (FEM) circuitry 7108, one or more antennas 7111 coupled together at least as shown.

The baseband circuitry 710 may be similar to and substantially interchangeable with baseband circuitry 510 or 610. The RFEM 715 may be similar to and substantially interchangeable with RFEMs 515 or 615 or RF circuitry 255.

The baseband circuitry 710 may include circuitry such as, but not limited to, one or more single-core or multi-core processors. The baseband circuitry 710 may include one or more baseband processors or control logic to process baseband signals received from a receive signal path of the RF circuitry 706 and to generate baseband signals for a transmit signal path of the RF circuitry 706. Baseband processing circuity 710 may interface with application circuitry for generation and processing of the baseband signals and for controlling operations of the RF circuitry 706. For example, in some embodiments, the baseband circuitry 710 may include a third generation (3G) baseband processor 704A, a fourth generation (4G) baseband processor 704B, a fifth generation (5G) baseband processor 704C, or other baseband processor(s) 704D for other existing generations, generations in development or to be developed in the future (e.g., second generation (2G), sixth generation (6G), etc.). The baseband circuitry 710 (e.g., one or more of baseband processors 704A-D) may handle various radio control functions that enable communication with one or more radio networks via the RF circuitry 706. In other embodiments, some or all of the functionality of baseband processors 704A-D may be included in modules stored in the memory 704G and executed via a Central Processing Unit (CPU) 704E. The radio control functions may include, but are not limited to, signal modulation/demodulation, encoding/decoding, radio frequency shifting, etc. In some embodiments, modulation/demodulation circuitry of the baseband circuitry 710 may include Fast-Fourier Transform (FFT), precoding, or constellation mapping/demapping functionality. In some embodiments, encoding/decoding circuitry of the baseband circuitry 710 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 710 may include one or more audio digital signal processor(s) (DSP) 704F. The audio DSP(s) 704F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 710 and application circuitry may be implemented together such as, for example, on a system on a chip (SOC).

In some embodiments, the baseband circuitry 710 may provide for communication compatible with one or more radio technologies. For example, in some embodiments, the baseband circuitry 710 may support communication with an EUTRAN or other wireless metropolitan area networks (WMAN), a wireless local area network (WLAN), a wireless personal area network (WPAN). Embodiments in which the baseband circuitry 710 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path which may include circuitry to down-convert RF signals received from the FEM circuitry 7108 and provide baseband signals to the baseband circuitry 710. RF circuitry 706 may also include a transmit signal path which may include circuitry to up-convert baseband signals provided by the baseband circuitry 710 and provide RF output signals to the FEM circuitry 7108 for transmission.

In some embodiments, the receive signal path of the RF circuitry 706 may include mixer circuitry 706a, amplifier circuitry 706b and filter circuitry 706c. In some embodiments, the transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 7108 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 710 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, the mixer circuitry 706a of the transmit signal path may be configured to up-convert input baseband signals based on the synthesized frequency provided by the synthesizer circuitry 706d to generate RF output signals for the FEM circuitry 7108. The baseband signals may be provided by the baseband circuitry 710 and may be filtered by filter circuitry 706c.

In some embodiments, the mixer circuitry 706a of the receive signal path and the mixer circuitry 706a of the transmit signal path may include two or more mixers and may be arranged for quadrature downconversion and upconversion, respectively. In some embodiments, the mixer circuitry 706a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a may be arranged for direct downconversion and direct upconversion, respectively. In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 710 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In some embodiments, the synthesizer circuitry 706d may be a fractional N/N+1 synthesizer.

In some embodiments, frequency input may be provided by a voltage controlled oscillator (VCO), although that is not a requirement. Divider control input may be provided by either the baseband circuitry 710 or the applications processor 605 depending on the desired output frequency. In some embodiments, a divider control input (e.g., N) may be determined from a look-up table based on a channel indicated by the applications processor 605.

Synthesizer circuitry 706d of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may be similar to and substantially interchangeable with RFFE 265. FEM circuitry 708 may include a receive signal path which may include circuitry configured to operate on RF signals received from one or more antennas 720 (for example, antenna panels 280 and 285), amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 720. In various embodiments, the amplification through the transmit or receive signal paths may be done solely in the RF circuitry 706, solely in the FEM 708, or in both the RF circuitry 706 and the FEM 7108.

In some embodiments, the FEM circuitry 708 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 720).

Processors of the baseband circuitry 710 may be used to execute elements of one or more instances of a protocol stack. For example, processors of the BB 704A, 704B, 704C, alone or in combination, may be used execute Layer 3, Layer 2, or Layer 1 functionality, while processors of the CPU 704E may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 8:
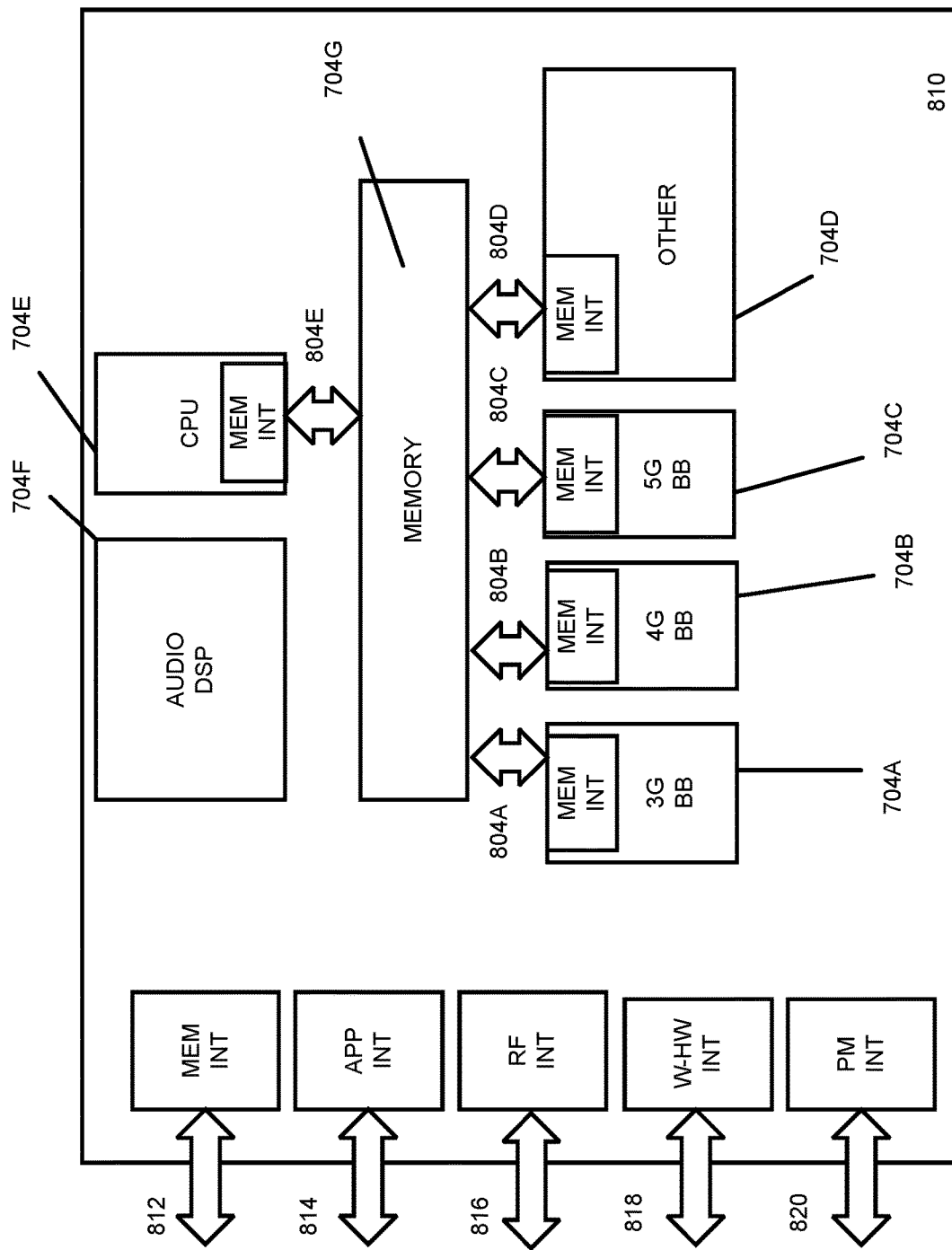
FIG. 8 depicts example interfaces of baseband circuitry in accordance with some embodiments.

FIG. 8 illustrates example interfaces of baseband circuitry in accordance with various embodiments. As discussed above, the baseband circuitry 710 of FIG. 7 may comprise processors 704A-704E and a memory 704G utilized by said processors. Each of the processors 704A-704E may include a memory interface, 804A-804E, respectively, to send/receive data to/from the memory 704G.

The baseband circuitry 710 may further include one or more interfaces to communicatively couple to other circuitries/devices, such as a memory interface 812 (e.g., an interface to send/receive data to/from memory external to the baseband circuitry 710), an application circuitry interface 814 (e.g., an interface to send/receive data to/from the application circuitry 605 of FIG. 6), an RF circuitry interface 816 (e.g., an interface to send/receive data to/from RF circuitry 706 of FIG. 7), a wireless hardware connectivity interface 818 (e.g., an interface to send/receive data to/from Near Field Communication (NFC) components, Bluetooth® components (e.g., Bluetooth® Low Energy), Wi-Fi® components, and other communication components), and a power management interface 820 (e.g., an interface to send/receive power or control signals to/from the PMIC 625.

Figure 9:
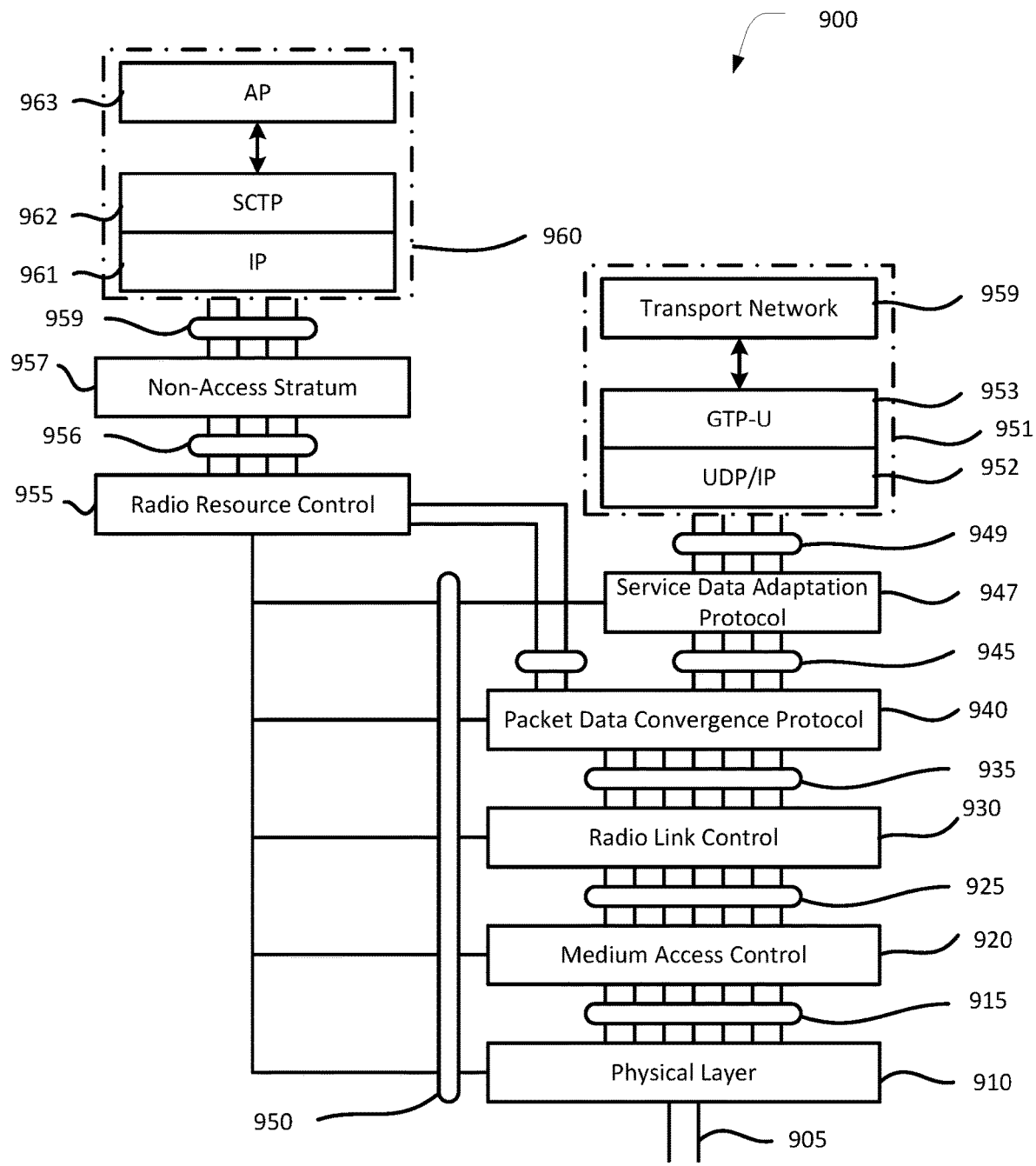
FIG. 9 is an illustration of a various protocol functions that may be used for various protocol stacks in accordance with various embodiments.

FIG. 9 illustrates various protocol functions that may be implemented in a wireless communication device according to various embodiments. In particular, FIG. 9 includes an arrangement 900 showing interconnections between various protocol layers/entities. The following description of FIG. 9 is provided for various protocol layers/entities that operate in conjunction with the 5G or New Radio (NR) system standards and LTE system standards, but some or all of the aspects of FIG. 9 may be applicable to other wireless communication network systems as well.

The protocol layers of arrangement 900 may include one or more of a physical layer (PHY) 910, a medium access control layer (MAC) 920, a radio link control layer (RLC) 930, a packet data convergence protocol layer (PDCP) 940, a service data adaptation protocol layer (SDAP) 947, a radio resource control layer (RRC) 955, and a non-access stratum (NAS) layer 957, in addition to other higher layer functions not illustrated. The protocol layers may include one or more service access points (e.g., items 959, 956, 949, 945, 935, 925, and 915 in FIG. 9) that may provide communication between two or more protocol layers.

The PHY 910 may transmit and receive physical layer signals 905 that may be received from or transmitted to one or more other communication devices. The physical layer signals 905 may comprise one or more physical channels, such as those discussed herein. The PHY 910 may further perform link adaptation or adaptive modulation and coding (AMC), power control, cell search (e.g., for initial synchronization and handover purposes), and other measurements used by higher layers, such as the RRC 955. The PHY 910 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing. In embodiments, an instance of PHY 910 may process requests from and provide indications to an instance of MAC 920 via one or more physical layer service access points (PHY-SAP) 915. According to some embodiments, requests and indications communicated via PHY-SAP 915 may comprise one or more transport channels.

Instance(s) of MAC 920 may process requests from, and provide indications to an instance of RLC 930 via one or more medium access control service access points (MAC-SAP) 925. These requests and indications communicated via the MAC-SAP 925 may comprise one or more logical channels. The MAC 920 may perform mapping between the logical channels and transport channels, multiplexing of MAC SDUs from one or more logical channels onto transport blocks (TB) to be delivered to PHY 910 via the transport channels, de-multiplexing MAC SDUs to one or more logical channels from TBs delivered from the PHY 910 via transport channels, multiplexing MAC SDUs onto TBs, scheduling information reporting, error correction through hybrid automatic repeat request (HARD), and logical channel prioritization.

Instance(s) of RLC 930 may process requests from and provide indications to an instance of PDCP 940 via one or more radio link control service access points (RLC-SAP) 935. These requests and indications communicated via RLC-SAP 935 may comprise one or more RLC channels. The RLC 930 may operate in a plurality of modes of operation, including: Transparent Mode™, Unacknowledged Mode (UM), and Acknowledged Mode (AM). The RLC 930 may execute transfer of upper layer protocol data units (PDUs), error correction through automatic repeat request (ARQ) for AM data transfers, and concatenation, segmentation and reassembly of RLC SDUs for UM and AM data transfers. The RLC 930 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 940 may process requests from and provide indications to instance(s) of RRC 955 and/or instance(s) of SDAP 947 via one or more packet data convergence protocol service access points (PDCP-SAP) 945. These requests and indications communicated via PDCP-SAP 945 may comprise one or more radio bearers. The PDCP layer 904 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 947 may process requests from and provide indications to one or more higher layer protocol entities via one or more service data adaptation protocol service access points (SDAP-SAP) 949. These requests and indications communicated via SDAP-SAP 949 may comprise one or more quality of service (QoS) flows. The SDAP 947 may map QoS flows to data radio bearers (DRBs), and vice versa, and may also mark QoS flow IDs (QFIs) in DL and UL packets. A single SDAP entity 947 may be configured for an individual PDU session. In the UL direction, the NG-RAN 520 may control the mapping of QoS Flows to DRB(s) in two different ways, reflective mapping or explicit mapping. For reflective mapping, the SDAP 947 of a UE may monitor the QoS flow ID(s) of the DL packets for each DRB, and may apply the same mapping for packets flowing in the UL direction. For a DRB, the SDAP 947 of the UE may map the UL packets belonging to the QoS flows(s) corresponding to the QoS flow ID(s) and PDU Session observed in the DL packets for that DRB. To enable reflective mapping, an NG-RAN may mark DL packets over the Uu interface with a QoS flow ID. The explicit mapping may involve the RRC 955 configuring the SDAP 947 with an explicit QoS flow to DRB mapping rule, which may be stored and followed by the SDAP 947. In embodiments, the SDAP 947 may only be used in NR implementations and may not be used in LTE implementations.

The RRC 955 may configure, via one or more management service access points (M-SAP), aspects of one or more protocol layers, which may include one or more instances of PHY 910, MAC 920, RLC 930, PDCP 940 and SDAP 947. In embodiments, an instance of RRC 955 may process requests from and provide indications to one or more NAS entities 957 via one or more RRC service access points (RRC-SAP) 956. The main services and functions of the RRC 955 may include broadcast of system information (e.g., included in Master Information Blocks (MIBs) or System Information Blocks (SIBs) related to the NAS), broadcast of system information related to the access stratum (AS), paging, establishment, maintenance and release of an RRC connection between the UE and RAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. The MIBs and SIBs may comprise one or more information elements (IEs), which may each comprise individual data fields or data structures.

The NAS 957 may form the highest stratum of the control plane between the UE and an AMF. The NAS 957 may support the mobility of UEs and the session management procedures to establish and maintain IP connectivity between the UE and a P-GW in LTE systems.

According to various embodiments, one or more protocol entities of arrangement 900 may be implemented in UE 104; TRPs 108 or 112 or the like to be used for control plane or user plane communications protocol stack between the aforementioned devices. In such embodiments, one or more protocol entities that may be implemented in one or more of UE 104, RAN nodes 108, 112, etc. may communicate with a respective peer protocol entity that may be implemented in or on another device using the services of respective lower layer protocol entities to perform such communication.

In a first example, a control plane protocol stack may comprise, in order from highest layer to lowest layer, NAS 957, RRC 955, PDCP 940, RLC 930, MAC 920, and PHY 910. In this example, upper layers 960 may be built on top of the NAS 957, which includes an internet protocol layer (IP) 961, an Stream Control Transmission Protocol layer (SCTP) 862, and an application layer signaling protocol (AP) 963.

In NR implementations, the AP 963 may be an NG application protocol layer (NGAP or NG-AP) 963 for the NG interface 513 defined between an NG-RAN node and the AMF, or the AP 963 may be an Xn application protocol layer (XnAP or Xn-AP) 963 for the Xn interface 512 that is defined between two or more RAN nodes.

The NG-AP 963 may support the functions of the NG interface and may comprise Elementary Procedures (EPs). An NG-AP EP may be a unit of interaction between an NG-RAN node and AMF. The NG-AP 963 services may comprise two groups: UE-associated services and non-UE-associated services (e.g., services related to the whole NG interface instance between an NG-RAN node and an AMF). These services may include functions including, but not limited to: a paging function for the sending of paging requests to NG-RAN nodes involved in a particular paging area; UE Context management function for allowing an AMF to establish, modify, and/or release a UE Context in the AMF and the NG-RAN node; mobility function for UEs in ECM-CONNECTED mode for intra-system HOs to support mobility within NG-RAN and inter-system HOs to support mobility from/to EPS systems; NAS Signaling Transport function for transporting or rerouting NAS messages between UE and AMF; a NAS node selection function for determining an association between the AMF and the UE; NG interface management function(s) for setting up the NG interface and monitoring for errors over the NG interface; warning message transmission function provides means to transfer warning messages via NG interface or cancel ongoing broadcast of warning messages; Configuration Transfer function for requesting and transferring of RAN configuration information (e.g., Self-Organizing Network (SON) information, performance measurement (PM) data, etc.) between two RAN nodes via CN; and/or other like functions.

The XnAP 963 may support the functions of an Xn interface and may comprise XnAP basic mobility procedures and XnAP global procedures. The XnAP basic mobility procedures may comprise procedures used to handle UE mobility within the NG RAN (or E-UTRAN), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE, such as Xn interface setup and reset procedures, NG-RAN update procedures, cell activation procedures, and the like.

In LTE implementations, the AP 963 may be an S1 Application Protocol layer (S1-AP) 963 for the S1 interface defined between an E-UTRAN node and an MME, or the AP 963 may be an X2 application protocol layer (X2AP or X2-AP) 963 for the X2 interface that is defined between two or more E-UTRAN nodes.

The S1 Application Protocol layer (S1-AP) 963 may support the functions of the S1 interface, and similar to the NG-AP discussed previously, the S1-AP may comprise S1-AP EPs. An S1-AP EP may be a unit of interaction between the E-UTRAN node and an MME within an LTE CN. The S1-AP 963 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 963 may support the functions of the X2 interface and may comprise X2AP basic mobility procedures and X2AP global procedures. The X2AP basic mobility procedures may comprise procedures used to handle UE mobility within the E-UTRAN, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE, such as X2 interface setup and reset procedures, load indication procedures, error indication procedures, cell activation procedures, and the like.

The SCTP layer (alternatively referred to as the SCTP/IP layer) 962 may provide guaranteed delivery of application layer messages (e.g., NGAP or XnAP messages in NR implementations, or S1-AP or X2AP messages in LTE implementations). The SCTP 963 may ensure reliable delivery of signaling messages between the RAN node and the AMF/MME based, in part, on the IP protocol, supported by the IP 961. The Internet Protocol layer (IP) 961 may be used to perform packet addressing and routing functionality. In some implementations the IP layer 961 may use point-to-point transmission to deliver convey PDUs. In this regard, the RAN node may comprise L2 and L1 layer communication links (e.g., wired or wireless) with the MME/AMF to exchange information.

In a second example, a user plane protocol stack may comprise, in order from highest layer to lowest layer, SDAP 947, PDCP 940, RLC 930, MAC 920, and PHY 910. The user plane protocol stack may be used for communication between the UE, the RAN node, and UPF in NR implementations or an S-GW and P-GW in LTE implementations. In this example, upper layers 951 may be built on top of the SDAP, and may include a user datagram protocol (UDP) and IP security layer (UDP/IP) 952, a General Packet Radio Service (GPRS) Tunneling Protocol for the user plane layer (GTP-U) 953, and a User Plane Protocol Data Unit layer (UP PDU) 963.

The transport network layer 954 (also referred to as a "transport layer") may be built on IP transport, and the GTP-U 951 may be used on top of the UDP/IP layer (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 953 may be used for carrying user data within the GPRS core network and between the radio access network and the core network. The user data transported can be packets in any of IPv4, IPv6, or PPP formats, for example. The UDP/IP 952 may provide checksums for data integrity, port numbers for addressing different functions at the source and destination, and encryption and authentication on the selected data flows. The RAN node and the S-GW may utilize an S1-U interface to exchange user plane data via a protocol stack comprising an L1 layer 911, an L2 layer, the UDP/IP layer 952, and the GTP-U 953. The S-GW and the P-GW may utilize an S5/S8a interface to exchange user plane data via a protocol stack comprising an L1 layer, an L2 layer, the UDP/IP layer 952, and the GTP-U 953. As discussed previously, NAS protocols may support the mobility of the UE and the session management procedures to establish and maintain IP connectivity between the UE and the P-GW.

Moreover, although not shown by FIG. 9, an application layer may be present above the AP 963 and/or the transport network layer 954. The application layer may be a layer in which a user of the UE, RAN node, or other network element interacts with software applications being executed, for example, by application circuitry 605. The application layer may also provide one or more interfaces for software applications to interact with communications systems of the UE or RAN node, such as the baseband circuitry 610. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 10:
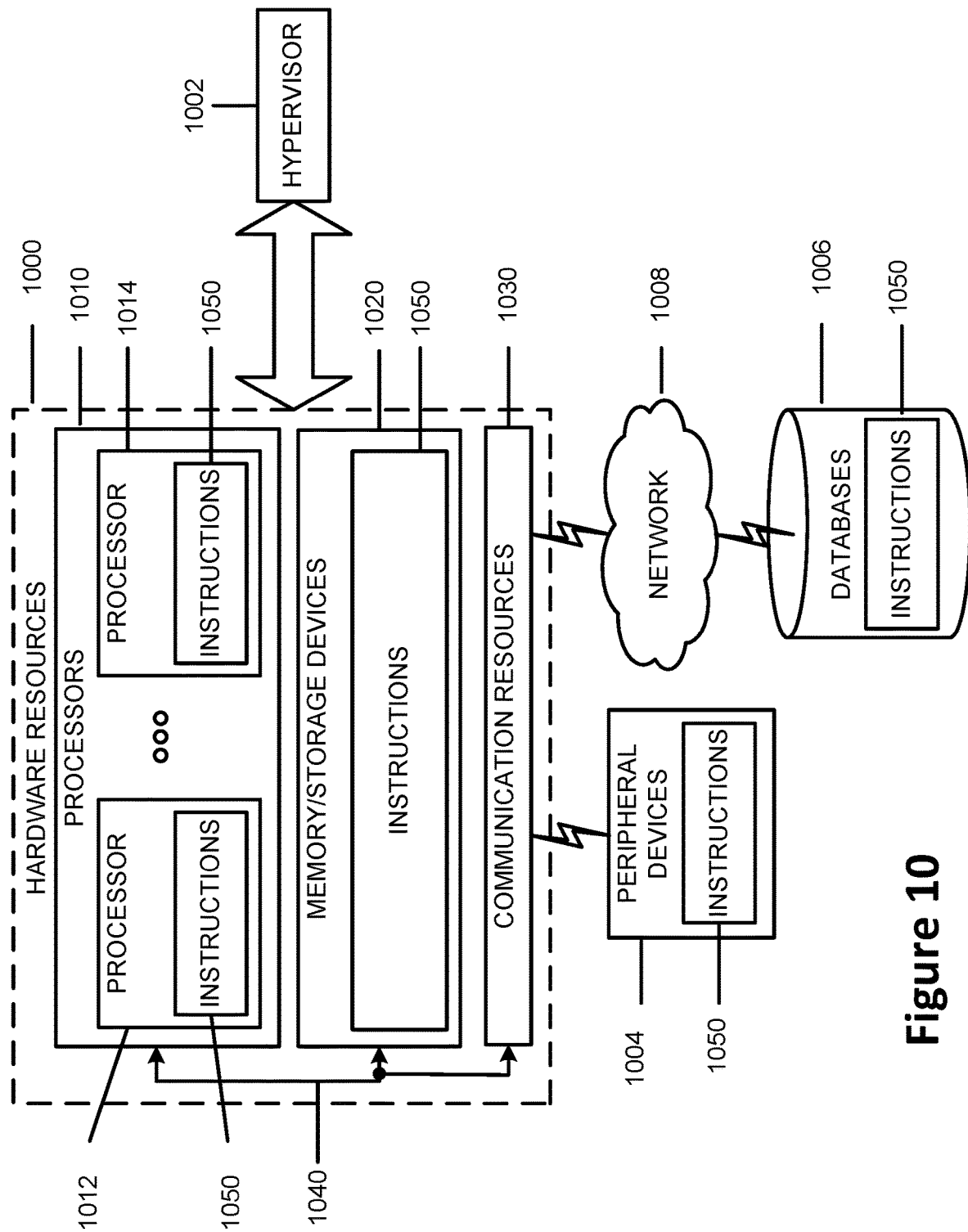
FIG. 10 is a block diagram illustrating components, according to some example embodiments, able to read instructions from a machine-readable or computer-readable medium (for example, a non-transitory machine-readable storage medium) and perform any one or more of the methodologies discussed herein.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 1002 may be executed to provide an execution environment for one or more network slices/subslices to utilize the hardware resources 1000. A "virtualized resource" may refer to compute, storage, and/or network resources provided by virtualization infrastructure to an application, device, system, etc.

The processors 1010 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1012 and a processor 1014.

The memory/storage devices 1020 may include main memory, disk storage, or any suitable combination thereof. The memory/storage devices 1020 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (e.g., for coupling via a Universal Serial Bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include a method of operating a UE, the method comprising: configuring one or more uplink codebooks; receiving feedback information from an access node; selecting, based on the feedback information, a precoder from a codebook of the one or more codebooks; and determining a scaling factor to scale the precoder to prevent a total transmission power from all antenna ports of the UE from exceeding a maximum transmission power, wherein the UE is to support full-power transmission and the scaling factor is one.

Example 2 may include the method of example 1 or some other example herein, wherein the UE is to support non-coherent transmission only and the precoder is an antenna-selection-based precoder.

Example 3 may include the method of example 1 or some other example herein, wherein the codebook is a single-layer codebook for two antenna ports and the precoder is [1/0] or [0/1].

Example 4 may include the method of example 1 or some other example herein, further comprising: receiving configuration information to configure the scaling factor.

Example 5 may include the method of example 4 or some other example herein, wherein to receive configuration information, the UE is to process higher-layer signaling.

Example 6 may include the method of example 4 or some other example herein, wherein the configuration information is to configure scaling factors per antenna port, per antenna port group, or across all antenna ports.

Example 7 may include the method of example 1 or some other example herein, further comprising: generating a report to indicate a maximum scaling factor supported per antenna port (AP), AP group, or across all APs.

Example 8 may include the method of example 1 or some other example herein, wherein the scaling factor is smaller than or equal to the maximum scaling factor.

Example 9 may include the method of example 1 or some other example herein, further comprising: generating a capability indication to indicate that the UE supports full-power transmission; and transmitting the capability indication to an access node.

Example 10 may include a method comprising: storing one or more codebooks; generating a physical uplink shared channel (PUSCH) transmission to be transmitted as a single-layer transmission on a subset of antenna ports of a UE; precoding the PUSCH transmission with a precoder selected from a codebook of the one or more codebooks; and causing the PUSCH transmission to be transmitted with a total transmission power available to all of the antenna ports.

Example 11 may include the method of example 10 or some other example herein, further comprising: causing the PUSCH transmission to be transmitted as a non-coherent transmission or a partial-coherent transmission.

Example 12 may include the method of example 10 or some other example herein, further comprising generating and causing transmission of a report to indicate that the UE supports full-power transmission.

Example 13 may include the method of example 10 or some other example herein, further comprising generating and causing transmission of a report to indicate the UE supports PUSCH to phase tracking reference signal (PT-RS) Energy Per Resource Element (EPRE) ratio configuration.

Example 14 may include a method of operating an access node, the method comprising: determining, based on first capability information, that a first user equipment (UE) supports full-power uplink transmission; providing first configuration information to configure the first UE with first codebook information to provide full-power uplink transmission; providing second configuration information to configure the second UE with second codebook information to provide non-full-power uplink transmission.

Example 15 may include the method of example 14 or some other example herein, wherein the first and second codebook information is to configure first and second codebooks, respectively.

Example 16 may include the method of example 15 or some other example herein, wherein the first codebook comprises precoders [1/0] and [0/1] and the second codebook comprises precoders 1N2 [1/0] and 1N2 [0/1].

Example 17 may include the method of example 14 or some other example herein, wherein the first codebook information is to configure a first codebook with a first scaling factor and the second codebook information is to configure the first codebook with a second scaling factor.

Example 18 may include the method of example 14 or some other example herein, further comprising: providing the second configuration information to configure the second UE with the second codebook based on capability information received from the second UE or as a default configuration.

Example 19 may include the method of example 14 or some other example herein, wherein each precoder of the first codebook are scaled to allow a total transmission power from all ports to reach the maximum transmission power.

Example 20 may include a method comprising: providing radio frequency signals for transmission by a plurality of antenna panels; and scaling power of each antenna panel of the plurality of antenna panels when a total transmission power for all antenna panels exceed a maximum transmission power, wherein for a transmission occasion, the transmission power for the individual antenna panels with uplink transmissions are scaled equally or based on priority associated with respective uplink transmissions.

Example 21 may include the method of example 20 or some other example herein, wherein scaling power of each antenna panel comprises: scaling down power of a first antenna panel associated with a first uplink transmission, wherein a second antenna panel is associated with a second uplink transmission and the second uplink transmission has a priority that is higher than a priority of the first uplink transmission.

Example 22 may include the method of example 21 or some other example herein, further comprising: determining relative priorities of the first and second uplink transmissions based on type of uplink signals, content of uplink signals, time-domain behavior of uplink signals, or triggering scheme of uplink signals.

Example 23 may include an apparatus comprising means to perform one or more elements of a method described in or related to any of examples 1-22, or any other method or process described herein.

Example 24 may include one or more non-transitory computer-readable media comprising instructions to cause an electronic device, upon execution of the instructions by one or more processors of the electronic device, to perform one or more elements of a method described in or related to any of examples 1-22, or any other method or process described herein.

Example 25 may include an apparatus comprising logic, modules, or circuitry to perform one or more elements of a method described in or related to any of examples 1-22, or any other method or process described herein.

Example 26 may include a method, technique, or process as described in or related to any of examples 1-22, or portions or parts thereof.

Example 27 may include an apparatus comprising: one or more processors and one or more computer readable media comprising instructions that, when executed by the one or more processors, cause the one or more processors to perform the method, techniques, or process as described in or related to any of examples 1-22, or portions thereof.

Example 28 may include a signal as described in or related to any of examples 1-22, or portions or parts thereof.

Example 29 may include a signal in a wireless network as shown and described herein.

Example 30 may include a method of communicating in a wireless network as shown and described herein.

Example 31 may include a system for providing wireless communication as shown and described herein.

Example 32 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. One or more non-transitory, computer-readable media having instructions that, when executed by one or more processors, cause a user equipment (UE) to:
configure one or more uplink codebooks, wherein configuring the one or more uplink codebooks include:
configuring a first scaling factor for one or more first antenna ports of the UE, and
configuring a second scaling factor for one or more second antenna ports of the UE, the second scaling factor being distinct from the first scaling factor;
receive feedback information from a first access node;
select, based on the feedback information, a precoder from a codebook of the one or more codebooks for communication with the first access node; and
apply the first scaling factor to the precoder to communicate with the first access node using the one or more first antenna ports, while concurrently communicating with a second access node using the one or more second antenna ports, wherein the first scaling factor is applied to the precoder to prevent a total transmission power from all antenna ports of the UE from exceeding a maximum transmission power of the UE, wherein the UE is to support full-power transmission.

2. The one or more non-transitory, computer-readable media of claim 1, wherein the UE supports non-coherent transmission and the precoder is an antenna-selection-based precoder.

3. The one or more non-transitory, computer-readable media of claim 1, wherein the codebook is a single-layer codebook for two antenna ports and the precoder is $$\begin{bmatrix}1\\0\end{bmatrix} \text{ or } \begin{bmatrix}0\\1\end{bmatrix}.$$

4. The one or more non-transitory, computer-readable media of claim 1, wherein the instructions, when executed, further cause the UE to: receive configuration information to configure the first scaling factor or the second scaling factor.

5. The one or more non-transitory, computer-readable media of claim 4, wherein to receive configuration information, the UE is to process higher-layer signaling.

6. The one or more non-transitory, computer-readable media of claim 4, wherein the configuration information is to configure scaling factors per antenna port (AP), per antenna port group, or across all antenna ports.

7. The one or more non-transitory, computer-readable media of claim 6, wherein the instructions, when executed, further cause the UE to:
generate a report to indicate a maximum scaling factor supported per antenna port (AP), AP group, or across all APs.

8. The one or more non-transitory, computer-readable media of claim 7, wherein at least one of the first scaling factor or the second scaling factor is smaller than or equal to the maximum scaling factor.

9. The one or more non-transitory, computer-readable media of claim 1, wherein the instructions, when executed, further cause the UE to:
generate a capability indication to indicate that the UE supports full-power transmission; and
transmit the capability indication to an access node.

10. An apparatus to be employed in a user equipment (UE), the apparatus comprising:
memory to store one or more codebooks; and
baseband circuitry, coupled with the memory, to:
generate a physical uplink shared channel (PUSCH) transmission to be transmitted as a single-layer transmission on a first subset of antenna ports of the UE;
precode the PUSCH transmission with a precoder selected from a codebook of the one or more codebooks, wherein the precoder is scaled with a first scaling factor corresponding to the first subset of antenna ports, and wherein a second scaling factor distinct from the first scaling factor is applied for communication using a second subset of antenna ports of the UE; and
cause the PUSCH transmission to be transmitted to a first access node using the first subset of antenna ports while concurrently communicating with a second access node using the second subset of antenna ports.

11. The apparatus of claim 10, wherein the baseband circuitry is further to cause the PUSCH transmission to be transmitted as a non-coherent transmission or a partial-coherent transmission.

12. The apparatus of claim 10, wherein the baseband circuitry is to generate and cause transmission of a report to indicate that the UE supports full-power transmission.

13. The apparatus of claim 10, wherein the baseband circuitry is to generate and cause transmission of a report to indicate the UE supports PUSCH to phase tracking reference signal (PT-RS) Energy Per Resource Element (EPRE) ratio configuration.

14. One or more non-transitory, computer-readable media having instructions that, when executed by one or more processors, cause an access node to:
  determine, based on first capability information, that a first user equipment (UE) supports full-power uplink transmission;
  provide first configuration information to configure the first UE with first codebook information to provide full-power uplink transmission, wherein each precoder of the first codebook is scaled using a first scaling factor to enable the first UE to concurrently communicate with a different access node using a second scaling factor that is distinct from the first scaling factor; and
  provide second configuration information to configure the second UE with second codebook information to provide non-full-power uplink transmission.

15. The one or more non-transitory, computer-readable media of claim 14, wherein the first and second codebook information is to configure first and second codebooks, respectively.

16. The one or more non-transitory, computer-readable media of claim 15, wherein the first codebook comprises precoders $$\begin{bmatrix}1\\0\end{bmatrix} \text{ or } \begin{bmatrix}0\\1\end{bmatrix}$$

and the second codebook comprises precoders $$\frac{1}{\sqrt{2}}\begin{bmatrix}1\\0\end{bmatrix} \text{ and } \frac{1}{\sqrt{2}}\begin{bmatrix}0\\1\end{bmatrix}.$$

17. The one or more non-transitory, computer-readable media of claim 14, wherein the first codebook information is to configure a first codebook with a first scaling factor and the second codebook information is to configure the first codebook with a second scaling factor.

18. The one or more non-transitory, computer-readable media of claim 14, wherein the instructions, when executed, further cause the access node to: provide the second configuration information to configure the second UE with the second codebook based on capability information received from the second UE or as a default configuration.

19. The one or more non-transitory, computer-readable media of claim 14, wherein the first scaling factor and the second scaling factor are selected to allow a total transmission power from all ports of the first UE to reach the maximum transmission power.

20. A user equipment (UE) comprising:
  transmit circuitry to provide radio frequency signals for transmission by a plurality of antenna panels of the UE; and
  baseband circuitry to scale power of one or more first antenna panels of the plurality of antenna panels using a first scaling factor and scale one or more second antenna panels of the plurality of antenna panels using a second scaling factor when a total transmission power for all antenna panels exceed a maximum transmission power for concurrent transmission to a first access node and a second access node using respectively the one or more first antenna panels and the one or more second antenna panels,
  wherein for a transmission occasion, the transmission power for individual antenna panels with uplink transmissions are scaled equally or based on priority associated with respective uplink transmissions.

21. The UE of claim 20, wherein to scale power of an antenna panel, the baseband circuitry is to:
  scale down power of the one or more first antenna panels associated with a first uplink transmission, wherein the one or more second antenna panels are associated with a second uplink transmission and the second uplink transmission has a priority that is higher than a priority of the first uplink transmission.

22. The UE of claim 21, wherein the baseband circuitry is to determine relative priorities of the first and second uplink transmissions based on type of uplink signals, content of uplink signals, time-domain behavior of uplink signals, or triggering scheme of uplink signals.

* * * * *